(12) United States Patent
Hogan

(10) Patent No.: US 8,910,552 B2
(45) Date of Patent: Dec. 16, 2014

(54) MOVABLE SAW APPARATUS AND METHOD

(75) Inventor: Michael E. Hogan, Littleton, CO (US)

(73) Assignee: Blue Collar Ventures, L.L.C., Littleton, CO (US)

( * ) Notice: Subject to any disclaimer, the term of this patent is extended or adjusted under 35 U.S.C. 154(b) by 1757 days.

(21) Appl. No.: 11/069,340

(22) Filed: Mar. 1, 2005

(65) Prior Publication Data

US 2006/0213341 A1  Sep. 28, 2006

(51) Int. Cl.
*B27B 5/20* (2006.01)
*B28D 1/04* (2006.01)
*B23D 47/02* (2006.01)
*B23D 59/02* (2006.01)
*B23D 45/04* (2006.01)

(52) U.S. Cl.
CPC ............. *B23D 59/02* (2013.01); *B23D 45/048* (2013.01); *B28D 1/044* (2013.01)
USPC ................ 83/171; 83/471.3; 83/490; 83/581; 451/11; 125/11.22; 125/13.03

(58) Field of Classification Search
USPC ................ 83/130, 168–171, 397, 486.1, 581; 125/13.01, 13.03, 15, 16.01, 16.04, 19, 125/20; 451/150, 449, 450, 236
See application file for complete search history.

(56) References Cited

U.S. PATENT DOCUMENTS

| 1,824,000 | A |   | 9/1931 | Walter |
|---|---|---|---|---|
| 2,241,142 | A |   | 5/1941 | Kvalheim |
| 2,413,016 | A | * | 12/1946 | Wiken et al. .......... 83/169 |
| 3,298,097 | A | * | 1/1967 | Gilbert .................. 29/564 |
| 3,341,983 | A |   | 9/1967 | Baldenhofer et al. |
| 4,002,094 | A | * | 1/1977 | Erickson et al. ........ 83/471.3 |
| 4,428,159 | A |   | 1/1984 | Sigetich et al. |
| 4,807,506 | A | * | 2/1989 | Audet .................. 83/486.1 |
| 4,976,251 | A |   | 12/1990 | Smith |
| 5,220,857 | A | * | 6/1993 | Freeburger ............ 83/468.3 |
| 5,435,294 | A |   | 7/1995 | Williamson |
| 5,482,026 | A | * | 1/1996 | Russell ................. 125/12 |
| D373,129 | S | * | 8/1996 | Wixey et al. ........... D15/133 |
| 5,564,323 | A | * | 10/1996 | Sasaki et al. ........... 83/471.3 |
| 5,676,124 | A | * | 10/1997 | Lee .................... 125/13.01 |
| 5,746,193 | A | * | 5/1998 | Swan .................. 125/13.03 |
| 5,755,148 | A | * | 5/1998 | Stumpf et al. ........... 83/468.2 |

(Continued)

OTHER PUBLICATIONS

Hitachi C10FSH, Hitachi 10" Sliding Dual Bevel Compound Miter Saw with Laser Marker, http://www.toolup.com, Professional Contractor Supplies, Oct. 9, 2007.

(Continued)

*Primary Examiner* — Laura M Lee
(74) *Attorney, Agent, or Firm* — Peter B. Scull; Hamilton DeSanctis & Cha LLP

(57) ABSTRACT

Disclosed is a movable cutting tool apparatus and/or methods for cutting workpieces; either generally including a cutting tool apparatus having a cutting tool unit support apparatus including at least a substantially stationary support structure and one or more rear-mount glide rails; a cutting tool unit which is supported by the support apparatus; a cutting implement held by the cutting tool unit, whereby the cutting tool unit operates and controls the cutting implement; and, at least one fluid coolant and/or lubricant tube connected to the cutting tool unit and adapted to flow a fluid to the cutting implement in operation; wherein the cutting tool unit and the cutting implement are directly movable with the glide rails to provide reciprocal and translational movability for the cutting tool unit and the cutting implement.

17 Claims, 6 Drawing Sheets

(56) References Cited

U.S. PATENT DOCUMENTS

| | | | |
|---|---|---|---|
| 6,000,387 A * | 12/1999 | Lee | 125/13.01 |
| 6,119,676 A | 9/2000 | Greenland | |
| 6,276,990 B1 * | 8/2001 | Greenland | 451/11 |
| 6,427,677 B1 | 8/2002 | O'Banion et al. | |
| D476,343 S * | 6/2003 | Leoncini | D15/127 |
| 6,591,826 B1 | 7/2003 | Donnerdal | |
| 6,755,107 B2 | 6/2004 | Peot et al. | |
| 6,845,788 B2 | 1/2005 | O'Banion et al. | |
| 7,140,361 B1 * | 11/2006 | Chao-Huan | 125/13.01 |
| 2003/0047895 A1 * | 3/2003 | McElroy | 280/79.3 |
| 2008/0276773 A1 * | 11/2008 | Togare | 83/34 |
| 2009/0211419 A1 * | 8/2009 | Wise | 83/169 |

OTHER PUBLICATIONS

FRS-30+ & FRS-38+ Tile, Marble and Granite Rail Saws, Felker Professional Dependability Since 1924, Full Line Catalog, 2007.

* cited by examiner

MOVABLE SAW APPARATUS AND METHOD

BACKGROUND

The present invention relates generally to saws or like cutting tools, but more particularly to the type of cutting tools that are usually used for the cutting of tiles and like materials.

In the laying of various types of tiles or like building materials for construction or re-modeling, it is desirable for the operator to have an easily transportable and compact cutting tool by which tiles may be cut to desired sizes and/or shapes. The most usual tool for the job is often referred to as a tile saw. Tile saws are often preferably relatively lightweight, and fairly compact, but would also preferably be capable of handling relatively large-sized tiles. Thus, while ceramic tile and the like saws have been known and are extensively used in the prior art, the tile saws currently available are either very large in order to accommodate large-sized tiles and thus, awkward to carry from job site to job site or involve mechanisms which require are inefficient for the operation of the saw blade to move it to, through and/or across the tile or in the movement of the tile to-be-cut relative to the blade. Large size conventional saw apparatuses do not allow for simple and accurate use by an operator, limiting the operator's ability to access and/or view the operation. Other conventional saw apparatuses with fixed-blade orientations do not allow for desirable angular cuts, or discrete depth cuts for holes or the like. These inefficiencies affect not only the quality of the end-product tiles, or like materials, but, also result in wastage from necessitated multiple attempts, and also in safety issues in attempting free-handed or like less safe operations.

Thus desired is a saw apparatus which is lightweight, easily portable and provides facility in use for the operator, whether in secure mounting and cutting operations, or in the control of the cutting operation for the creation of desired cuts and/or for the reduction of waste and/or improved safety.

BRIEF SUMMARY

Disclosed here is a movable cutting tool apparatus and/or methods for cutting workpieces; either generally including a cutting tool apparatus having a cutting tool unit support apparatus including at least a substantially stationary support structure and one or more rear-mount glide rails; wherein the one or more rear-mount glide rails are disposed within and are adapted to reciprocally and translationally slide within apertures defined in and through the substantially stationary support structure, the substantially stationary support structure being substantially stationary in operation; a cutting tool unit which is supported by the support apparatus being connected to the one or more rear-mount glide rails at and extending from the rear side of the cutting tool unit, the cutting tool unit being movable therewith relative to the substantially stationary support structure; a cutting implement held by the cutting tool unit, whereby the cutting tool unit operates and controls the cutting implement; and, at least one fluid coolant and/or lubricant tube connected to the cutting tool unit, the at least one fluid coolant and/or lubricant tube being adapted to flow a fluid to the cutting implement in operation; wherein the cutting tool unit and the cutting implement are directly movable with the glide rails to provide reciprocal and translational movability for the cutting tool unit and the cutting implement.

DETAILED DESCRIPTION

Figure 1:
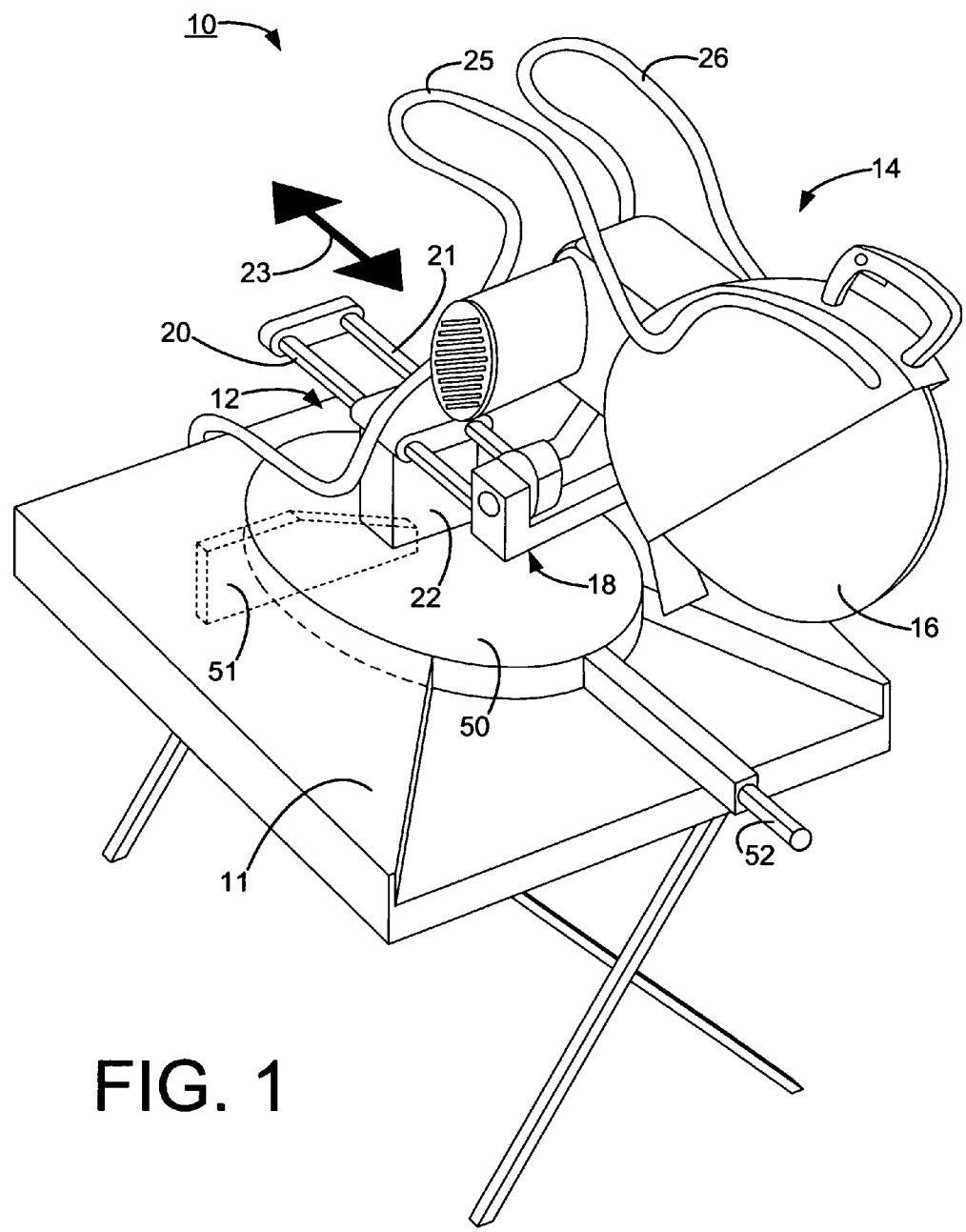
FIG. 1 presents an isometric view of a saw apparatus of the present invention as is described hereinbelow.

What follows here read together with and in view of the attached drawings, see e.g., FIG. 1, is an illustration of a preferred movable cutting tool or saw apparatus 10 which may include and/or may be disposed upon a table-like support structure 11 and which also generally includes a cutting tool support apparatus 12 which supports a cutting tool or saw unit 14 which in turn holds and operates a cutting implement or saw blade 16. The support apparatus 12 includes one or more rear-mounted glide rails, here shown as two such glide rails 20, 21 which are disposed in and are operative to reciprocally slide within apertures defined in and through a substantially stationary support structure 22, structure 22 being a portion of the cutting tool support apparatus 12. These glide rails 20, 21 are then also connected in a rear-mount fashion to a base structure 18 of the cutting tool or saw unit 14. The base structure 18 and saw unit 14 are thereby directly movable with the glide rails 20, 21 to provide reciprocal movability to/for the saw unit 14 and blade 16 (see the arrow 23 which indicates the direction of movability). Of initial note also shown in FIG. 1 are two fluid coolant or lubricant tubes 25, 26 which are used to flow a fluid coolant and/or lubricant to the blade 16 in operation. As described in further detail below, saw apparatuses 10 hereof may be particularly useful in many forms for the cutting of tiles or like hard building materials, e.g., bricks, rocks, concrete, inter alia.

Figure 2A:
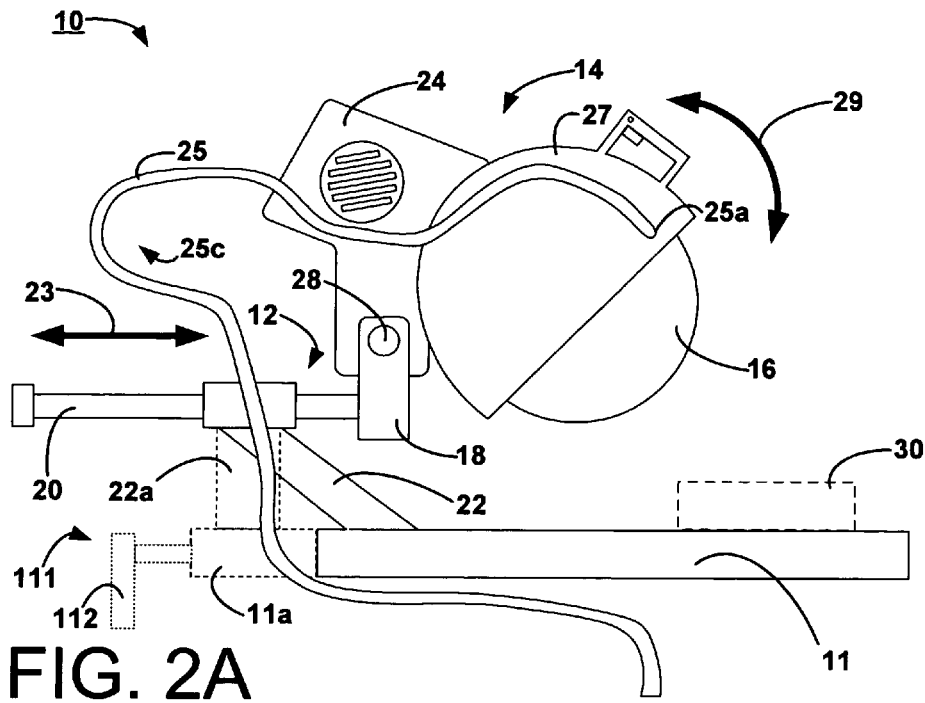
FIG. 2, which includes sub-part FIGS. 2A and 2B, provides side elevational views of a saw apparatus such as that shown in FIG. 1.
Figure 2B:
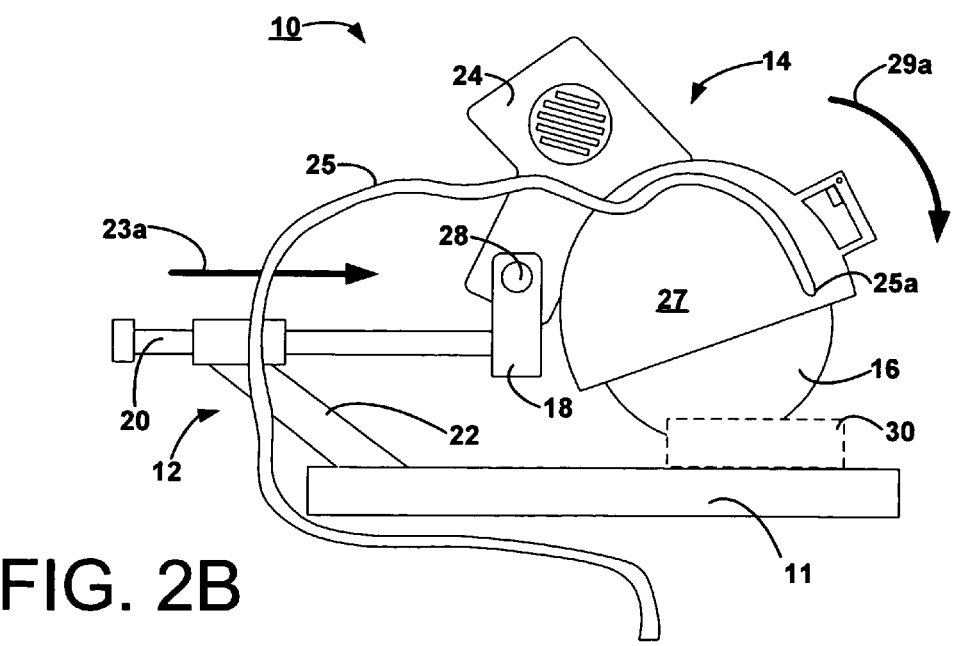
Figure 3:
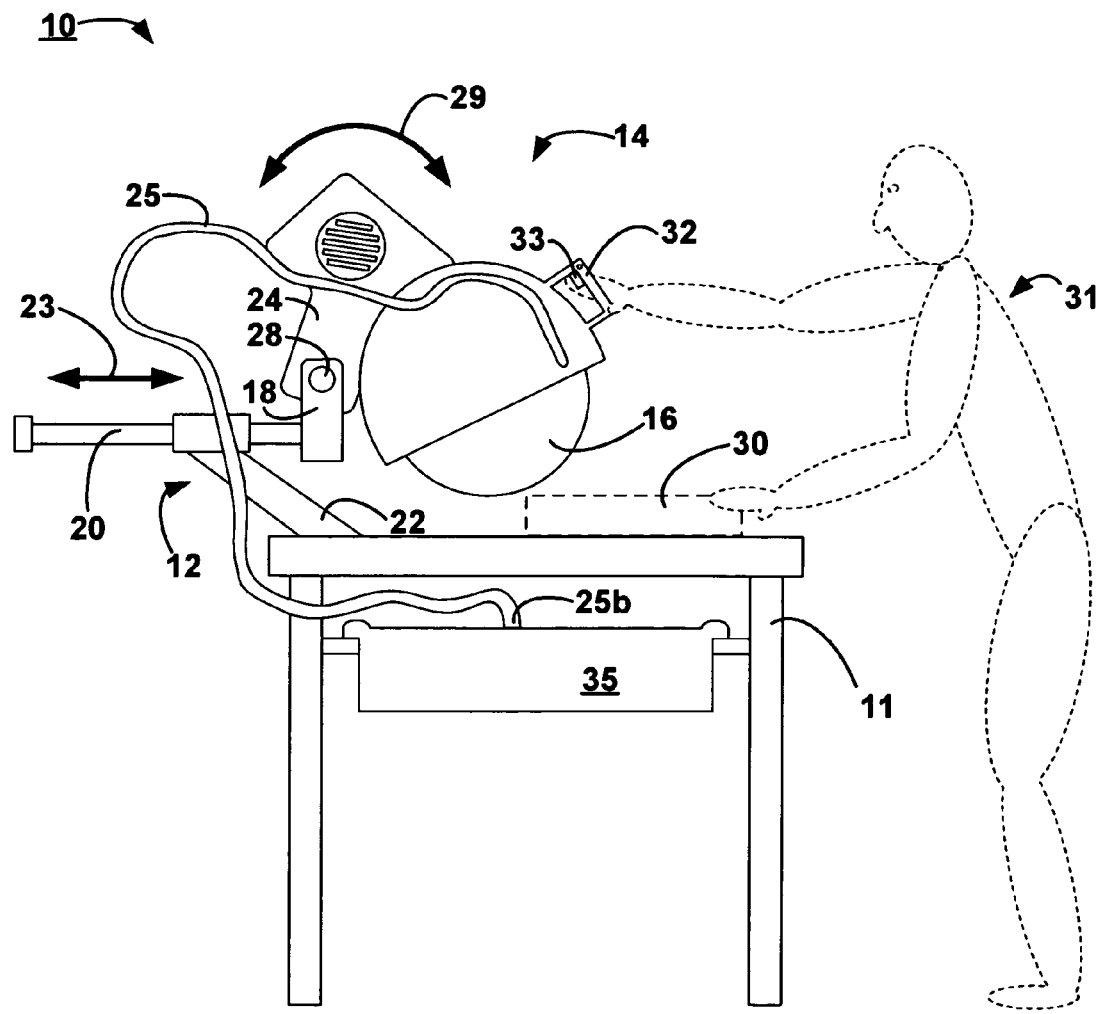
FIG. 3 provides a side elevational view of a saw apparatus such as that shown in FIGS. 1 and 2.

Referring now more specifically to the operative FIGS. 2 and 3, the cutting tool unit 14 is here also shown supported by the support apparatus 12, being connected to the one or more rear-mount glide rails 20, 21 (only rail 20 being shown in the side views of FIGS. 2 and 3) at and extending from the rear side of the cutting tool unit 14, more particularly here from the base 18 thereof; the cutting tool unit 14 being reciprocably and substantially linearly movable with the rail or rails relative to the substantially stationary support structure 22. Note the linear movability indicated by the arrow 23 in FIG. 2A and the consequent forward linear movement indicated by the arrow 23a in FIG. 2B. As such, the glide rail 20 is shown having moved relative to the support structure 22 and thereby has moved the saw or cutting tool unit 14 forward as well. Also shown in this transition from FIG. 2A to FIG. 2B is the taking up of the intentional slack in the coolant tube 25 as the cutting tool 14 is moved forward from the back, slack position of FIG. 2A to the forward, substantially non-slack position of FIG. 2B. The forward end 25a of the tube 25 which is connected to the blade cover 27, moves forward with the cutting tool unit 14 and thereby draws up the slack, identified generally by the reference numeral 25c.

Moreover, an optional though preferred rotational movement of the saw unit 14 relative to the support 12 is also shown in the progression from FIG. 2A to FIG. 2B. Though such a rotation could be effected by a variety of possible means, here shown is a movement of the motor housing structure 24 of the saw unit 14 about a pivot 28 connection to the base 18 in a rotational mode indicated generally by the arrow 29 in FIG. 2A, and more specifically by the downward rotational arrow 29a in FIG. 2B. The blade 16 would thus be effectively rotatable and here rotated therewith and may then as shown be controlled in its engagement with a workpiece 30 to be cut. FIG. 3 demonstrates how a human operator 31 may then be involved in controlling the apparatus 10; here standing in what may be considered a front position relative to the apparatus 10 and engaged to grasp the handle 32 of the saw unit 14 and pull the saw unit 14 toward him or herself to engage and cut the workpiece 30. A button or buttons 33 may be disposed in/on the handle 32 for engagement by an operator 31 to control the cutting implement or blade 16. Note, as described further below, an alternative may be provided for locking the blade and power switch in the "on" position so that the saw may operate hands free and thereby afford the operator the ability to manipulate a piece of tile with both hands.

Also shown in FIG. 3 is a fluid coolant and/or lubricant reservoir (e.g., a pan or trough) 35 slung below the table 11. The reservoir 35 contains a fluid coolant and/or lubricant, such as the commonly-used water, inter alia, which can be flowed into the fluid tube or tubes, only tube 25 being shown in FIG. 3, via the lower or rearward end 25b of the tube 25. This fluid may be pumped (pump not shown, though such may be submersible and contained within the reservoir 35, inter alia) or otherwise moved into and through the tube 25 up to and through the forward end 25a which projects through the blade cover 27 to spray the fluid on the blade 16 particularly as this blade is spinning in operation to keep the blade cooled and/or lubricated while cutting a workpiece. Used fluid may in some embodiments, then be caught on the table 11 and funneled through one or more holes therein (not shown) down to the reservoir 35 and thereby be recycled back to the blade again and again. This fluid may not only cool and/or lubricate the blade and/or the workpiece, it may also cut down on the dust associated with sawing through a tile or like hard building materials.

With these basic elements, the apparatus 10 may be generally operative as follows. With the table 11 preliminarily set up or with the use of the saw apparatus 10 on a discrete support surface, and with the saw 14 in the upright and back position; upright rotated about pivot 28 to a full or nearly full up position, and back where the glide rails are slid back to the full or nearly full back position, see FIGS. 2A and 3, then a workpiece 30 to be cut may be set (which may include securing it and/or clamping it) on the cutting surface of the table 11 (or alternative support). Such a workpiece 30 is shown in FIGS. 2 and 3. Then, the cutting implement 16, either by itself or in unison with the cutting tool unit 14, may be moved into cutting position, as by rotating downward, if necessary, and/or by translationally moving the implement 16 by the sliding of the glide rails 20, 21 within the substantially stationary support structure 22. When the button 33 is pushed and the handle 32 manipulated as desired, the implement 16 then makes the desired cut in the workpiece 30 as shown in FIG. 2B, and once completed, the unit 14 can be moved back to the starting position. In many embodiments, the button 33 may provide a safety feature in requiring engagement as by an operator in order to spin the blade, and then stopping the blade when disengaged. Note, the movements may be mechanical only, as operated by programmed machinery, or may be manipulations of a human operator 31 as shown in FIG. 3.

As a consequence, greater operative control may be had. First, the operator 31 has greater control over the workpiece 30 which can be clamped to the table 11 so that it does not move during the cutting operation regardless the depth or length of the cut (i.e., regardless whether the cut is intended to traverse the entire or some partial amount of the length or width of the workpiece, or whether the cut is intended to work to the complete depth of the workpiece). Moreover, the operator has a direct line of sight so that the operator, when disposed in front of the saw 10 as shown in FIG. 3, always has a direct view of the saw blade 16 as it comes into contact with and progresses along a cut of a workpiece 30.

Figure 4A:
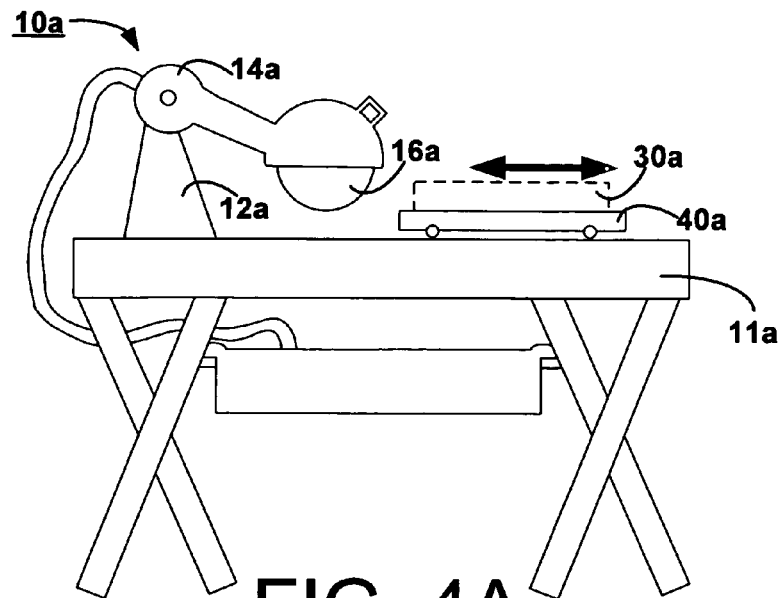
FIG. 4, which includes sub-part FIGS. 4A and 4B, provides side elevational views of two prior art saw apparatuses.
Figure 4B:
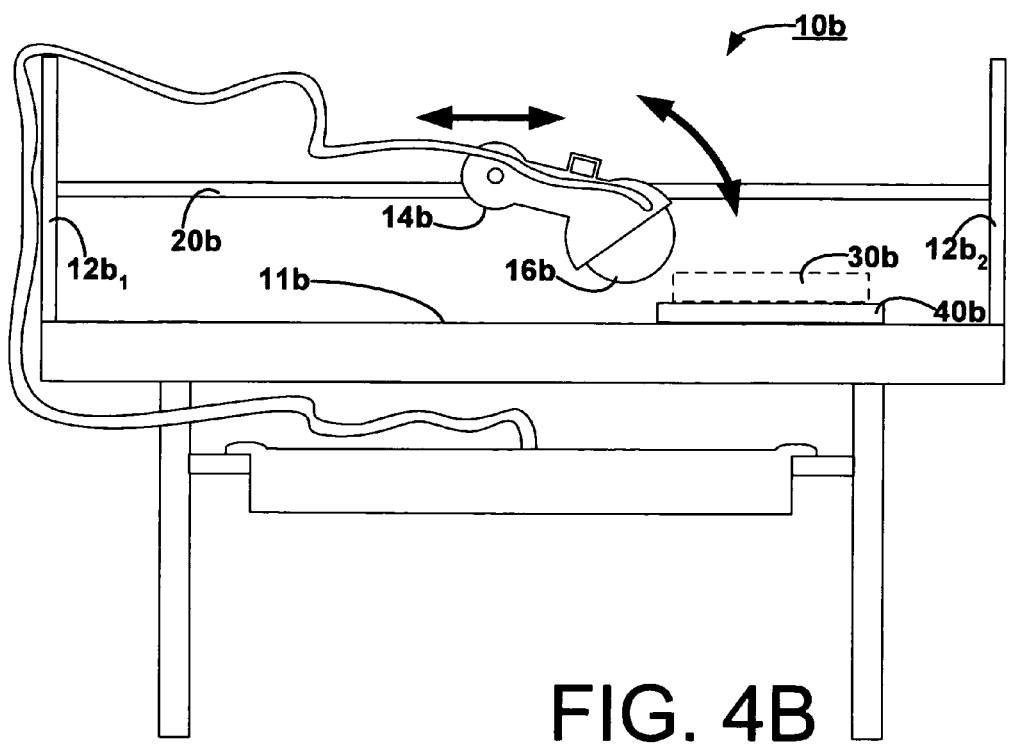

This is in contrast to the state of the art saw apparatuses as shown for example in FIG. 4. In particular, as shown in FIG. 4, state of the art/conventional tile saws are of two basic types; first is the fixed blade type 10a which has a moving workpiece 30a as shown in FIG. 4A, and second is the fixed workpiece type 10b with a moving motor 14b and blade 16b as shown in FIG. 4B. These second saws are commonly referred to as "rail" saws. Both of these types of saws have severe limitations in their abilities to make various kinds of cuts, whether of making discrete depth cuts or in cutting proper and/or multiple angles as the job conditions may dictate.

First, the standard fixed blade tiles saws, such as saw 10a are limited by the type and size of the tile to be cut. Angle cuts are made on a gauge mounted to the slide tray 40a (shown with schematic rollers on the table 11a in FIG. 4A). Positioning of the tile to be cut must be done by "holding" it by hand so as to not let the tile slide too far into the cutting "trough." Angle cuts must be guessed at with an angle finder and then interpreted to the position of the tile as it relates to the blade position. In some instances, large tile cuts inevitably end up hitting the mast or bracket, see the mast 12a in FIG. 4A, to which the fixed position motor 14a and blade 16a are mounted. The tile must be "free-handed" to finish the cut. Depth cuts also suffer with fixed blade saws, wherein the operator must free-handedly hold the workpiece to the desired height to achieve the desired depth cut. An example of this may include the cutting of a hole in a piece of tile, such as a square hole. With a saw 10a this requires the holding of the tile with two hands, and then freehanding the cut by pressing the tile against the spinning blade. Such tiles are often broken because holding the tiles steady enough with appropriate pressure (not too much or too little pressure) is difficult.

On the other hand, rail saws, such as saw 10b in FIG. 4B, allow for various angle and/or depth cuts. Tiles or like workpieces 30b can be cut at various angles by rotating a tray 40b or a large rail, such as rail 20b, within a 90 degree angle on either or both of two dimensional planes, either perpendicular to the tray 40b and/or at an adjustable angle to the tray 40b. If the rail is to be moved, then, each end of the rail must be loosened and then tightened once the desired angle is found. This is done by loosening one end of the rail at one support, e.g., support 12$b_1$ moving to the other end of the saw apparatus, loosening and setting the desired angle at the second support, e.g., support 12$b_2$, moving back to the other end and securing the angle. Even if the tray 40b may more easily be moved and/or fixed to the table 11b, operability of the rail saw 10b suffers in that all operation must be performed from the side, leaning over sideways and attempting to line up the cut without a direct line of sight of the saw blade 16b particularly with the moving motor 14b. Moreover, most rail saws are also very cumbersome to move on a job site. They are heavy and the size of the saw apparatus limits places to set up on a tile project.

The present apparatus(es) 10 avoid these problems (see above) and provide for the cutting of various materials including very hard materials, such as porcelain tiles, inter alia. Conventional tile saws, see e.g., FIG. 5A, may be adapted to cut accurate square cuts; however, when using conventional saws with such hard materials such as porcelains, the act of pushing the porcelain tile into the fixed blade was causing the blade to cut out of square. The combination of hardness of the porcelain and the pressure needed to force the porcelain tile into/through the blade also causes conventional blades to "bend" at the moment of contact/cutting causing error in the cut. The tile saw 10 hereof alleviates this problem by allowing for the passing the blade over the top of the tile in a sort of scribing motion to scribe the porcelain. Finishing the cut then may involve the same motion as cutting a slice of bread, back and forth ever more slightly deeper into the tile. Thus, the back and forth motion 23 combined with the rotational downward motion 29a can provide for cutting harder materials with much reduced error.

Thus, a saw 10 of the present invention provides solutions for each of these problems. By providing the translational movability of the saw (by the movement of the glide rails relative to the support structure, the workpiece can be securely mounted to the work surface, thereby avoiding any "freehanding." And, because the saw is provided with a depth pivot at pivot 28, the depth can be controlled and all of these functions controlled with a direct frontal line of sight with no leaning or sideways eyeballing. Then, cutting a square hole in a piece of tile can be simply achieved without inappropriate "freehanding" or costly breakage due to unsteady or inappropriate pressures. This new saw design would allow the user to set the tile in a fixed position, and the saw would then be moved into position over the cut and then done cleanly and safely.

Note, some "free handing" of tile on a tile saw 10 hereof may also be available. This would often involve an operator, e.g., operator 31, using one or both hands manipulating the tile as the blade spins. In order to accommodate such a circumstance, the saw could have the unique ability to fix the blade in a lowered position, usually by a kind of set pin or the like at the rotational point 28 in FIGS. 2 and/or 3, or elsewhere in the base 18. The switch or button 33 would then be triggerable as before; however, provision may be made for locking the blade and power switch in the "on" position, as by a lock pin (not identified in the drawings) which could be used to lock the button 33 in operating position (causing continued motion of the implement or blade 16). Then, setting this lock pin in place would allow the saw to operate hands free and afford the operator to manipulate a piece of tile with both hands. In many embodiments, the switch 33 would then be pressable again to release the lock pin and the saw would be turned off. Even so, a safety button or trigger 33 may alternatively be used wherein there is no lock pin and the implement or blade is only activated to operative motion (here circular movement) when the trigger is compressed, and the blade stops when the trigger is released. Note still further that in some embodiments, the trigger 33 may also be operable to activate the pump or other fluid motive means to initiate and/or maintain a flow and spray of fluid through and from tube 25 (and/or 26) to cool and/or lubricate the blade simultaneously with operable blade movement.

Figure 5A:
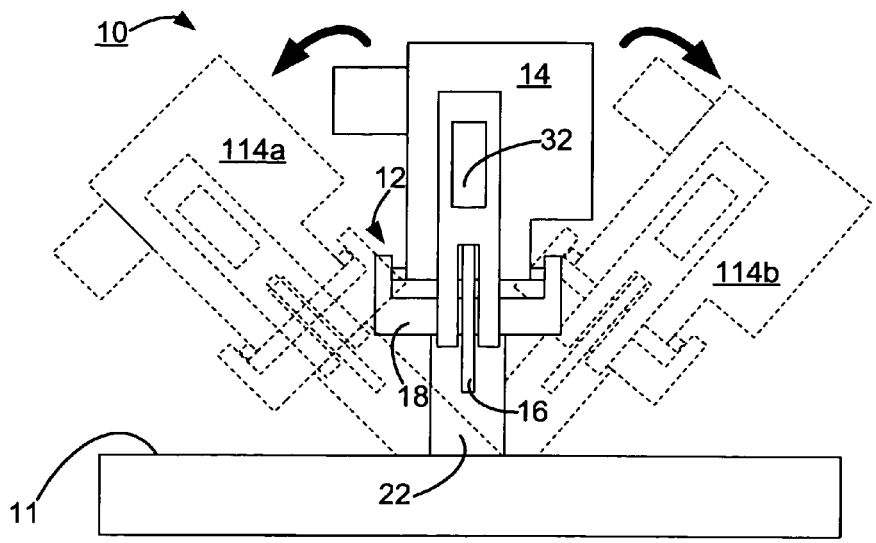
FIG. 5, which includes sub-part FIGS. 5A and 5B, provides respective front elevational and top plan views of a saw apparatus such as that shown in FIGS. 1, 2 and/or 3; and, FIG. 6 provides a side elevational view of an alternative saw apparatus according hereto.
Figure 5B:
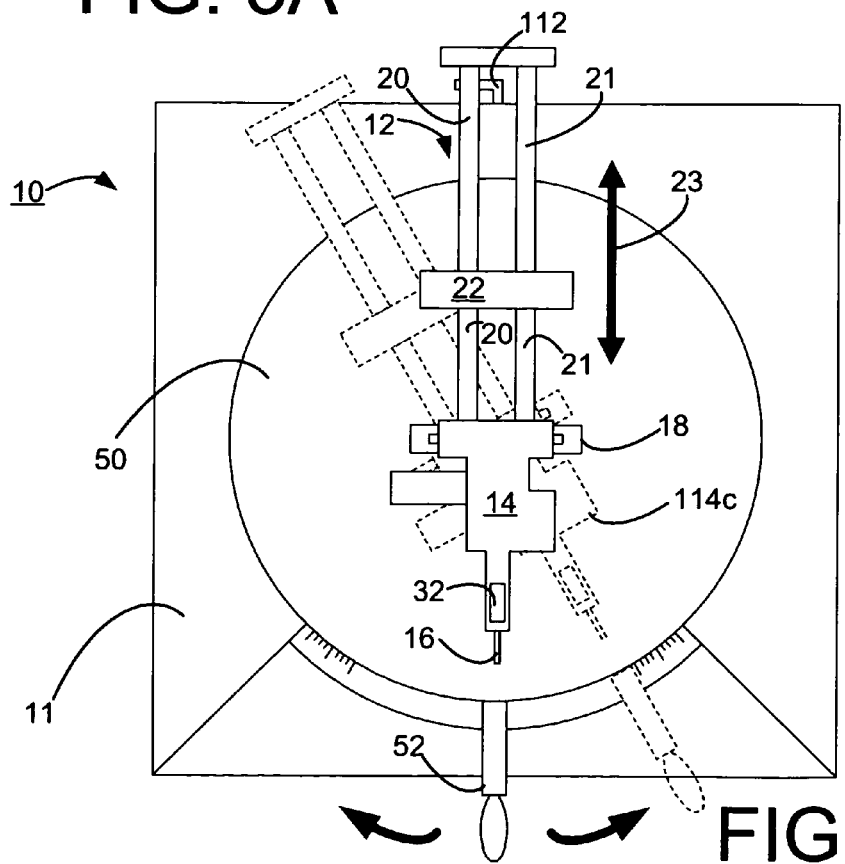

Further alternatives are also shown in the drawings of FIG. 5 which provide the inclusion of alternative angular cutting. In particular, shown in FIG. 5A are tilted versions 114a and 114b (shown in dashed lines) of the saw unit 14. Such tilting may be at any of many various angles and provides for the angular cutting of the edges of a tile or like building material. Note, the rotatable portion is adapted to rotate in a substantially vertical plane about a substantially horizontal pivot axis, the pivot axis not being shown as it is perpendicular to the drawing sheet. Though not shown in FIG. 5A, on the rear side of the table 11 may optionally be positioned a locking assembly 111 (see FIGS. 2A and 6) which in this particular instance comprises lever arm 112 (see FIGS. 2A, 5B and 6) which is pivotally mounted to the table, operably connected to the table assembly and, more specifically, to the support structure 12, such that rotation of the lever 112 may be either into an unlocked position to allow for tilting the saw unit 14 to a desired edge angle, and then lever 112 may be rotated into a full engaging position to lock the saw unit in the particular desired angular orientation.

Additionally, in order to obtain angular or diagonal plan cuts, or to accommodate other types of cuts and larger tiles, the table 11 may include a rotatable assembly 50 as shown in FIGS. 1 and 5B. Rotatable assembly 50 may be configured to rotate through various angular orientations, as for example a full 360 degree circle, or some amount less as for example, through about 90 degrees as suggested by the embodiments of FIGS. 1 and 5B. See the rotated portion 114c of FIG. 5B (shown in dashed lines). Note, the rotatable portion is adapted to rotate in a substantially horizontal plane about a substantially vertical pivot axis, the pivot axis not being shown as it is perpendicular to the drawing sheet. A handle 52 may be used to effectuate these rotations; noting also the graduated markings on the table to assist the definition of the angle. Moreover, as shown in dashed lines in FIG. 1, a fence 51 or a plurality of fences (e.g., one on each side of the blade 16) may be used for many cutting jobs, but also here, in conjunction with the rotatable assembly 50 in order to accommodate cutting on an angle, e.g. on a diagonal. Such fences or stops may thus provide greater support, edge wise, for a tile or like workpiece 30 that would be received within the confines of the upstanding support or supports 51. The support or supports 51 may be movable so that they may be configured to receive various sizes and/or shapes of workpieces 30. Indeed, where a larger tile is contemplated, the upstanding supports 51, might be moved or removed to accommodate such larger sized tiles. Clamps (not shown) may also be used in conjunction with the fences and/or other table parts to securing hold a workpiece 30 during a cutting operation.

Figure 6:
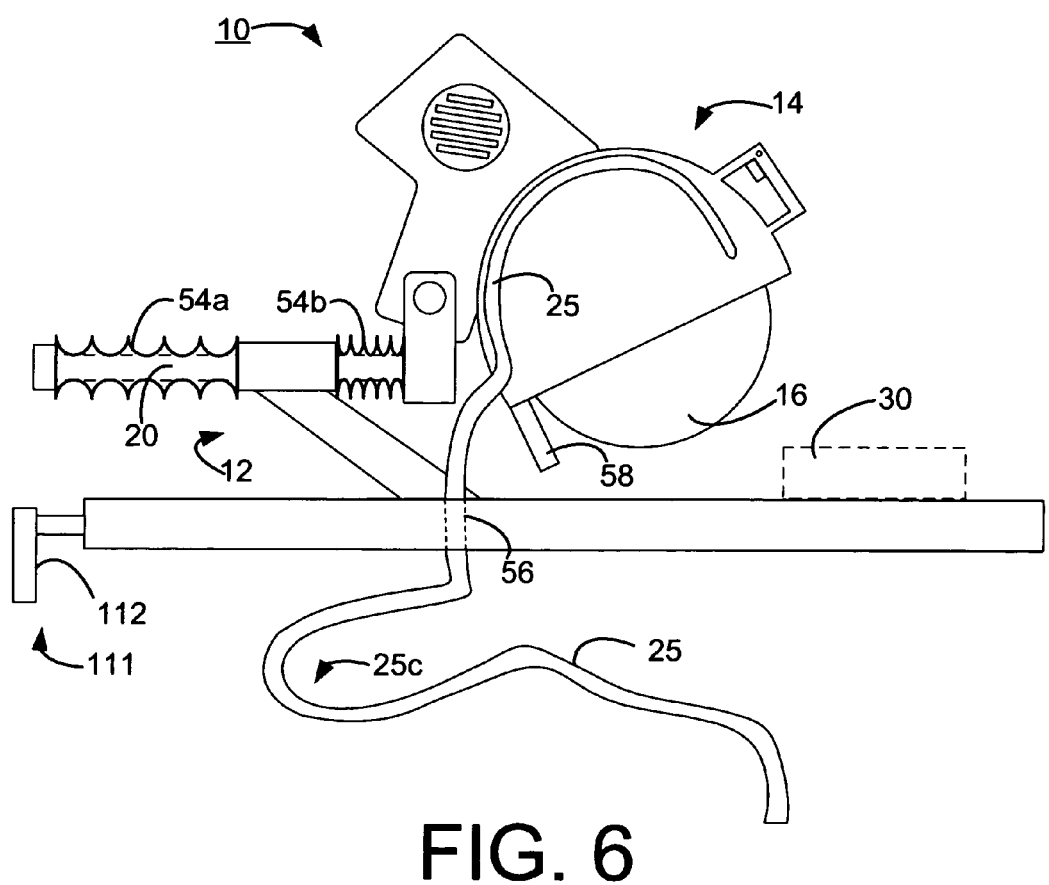

Additional alternatives are shown in FIG. 6, inter alia. A first alternative is the addition of one or more gusseted or accordion-type covers 54a and 54b as shown. These will preferably be expandable and contractible to continually cover the glide rails and thereby be useful to keep fluid and grit (often highly abrasive, e.g., diamond particles) off the otherwise preferably clean (and/or separately lubricated) glide rails 20, 21. Such covers will preferably be of a flexible, yet sturdy material such as rubber or a polymeric material. Similarly, a further alternative shown in FIG. 6 includes one or more apertures 56 formed in the table 11 to allow passage of the tube or tubes 25 (tube 26 not shown in FIG. 6). Note, the loop 25c may be above the table 11 as before (see FIG. 2, then, the tube may be either fixed or movable within the aperture), or the loop 25c (FIG. 6) may be below the table while the tube may be passed through the table during operation to allow for the forward movement of the saw. Note, a single tube may be disposed to communicate with the fluid in the tray; however, the single tube may at some point branch into two separate tubing lengths, resulting in one for each side of the saw blade. A still further alternative is the addition of a large deflection shield 58 attached to and below the blade cover member. This sort of shield would be beneficial with the large amount of fluid and grit being moved around the table by the blade 16.

Note also that as shown in FIG. 2A, there are alternative support structures 22 as well, whether straight 22a or reclined 22. An extended table area 11a could be needed depending upon the type of support structure used. Further alternative structures may include folding legs under the table and/or a handle on one or more sides of the table for making the apparatus 10 portable.

Although the description hereinabove sets forth both a preferred and various optional embodiments, a summary description of the preferred embodiment is that it may include all or only some of the features shown and addressed thusfar. More particularly, the apparatus or system 10 may include a cutting tool unit support apparatus including at least a substantially stationary support structure and one or more rear-mount glide rails; wherein the one or more rear-mount glide rails are disposed within and are adapted to reciprocally and translationally slide within apertures defined in and through the substantially stationary support structure, the substantially stationary support structure being substantially stationary in operation; a cutting tool unit which is supported by the support apparatus being connected to the one or more rear-mount glide rails at and extending from the rear side of the cutting tool unit, the cutting tool unit being movable therewith relative to the substantially stationary support structure; a cutting implement held by the cutting tool unit, whereby the cutting tool unit operates and controls the cutting implement; and, at least one fluid coolant and/or lubricant tube connected to the cutting tool unit, the at least one fluid coolant and/or lubricant tube being adapted to flow a fluid to the cutting implement in operation; wherein the cutting tool unit and the cutting implement are directly movable with the glide rails to provide reciprocal and translational movability for the cutting tool unit and the cutting implement.

Moreover, in general terms, methods of use hereof may be summarized in various ways including, for example: a method of cutting a tile or like building material, the method including securing a workpiece to be cut on a cutting surface; moving a wet cutting implement into cutting position by translationally moving the wet cutting implement, the wet cutting implement being operably connected to one or more glide rails which are operably movable in a substantially stationary support structure, the moving of the wet cutting implement being effected by the sliding of the glide rails within the substantially stationary support structure; making the desired cut in the workpiece by engaging the cutting implement with the workpiece.

The compact tile saw apparatus 10, is not only lightweight for easy carrying but also because of its compact size, is easy to use, for example, in cramped quarters or on countertops when the tile setter, for example, may be laying tile to form a counter. The tile cutter 10 is found to fulfill all the requirements for its size of handling large sized tiles, is convenient and efficient to utilize in that the two hands of the operator, where the saw means is in a stationary position, may be used to move the table 11 towards the stationary saw, and where the saw means 14 is intended to be movable in unison with the rear mount glide rails 20, 21.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

Accordingly what is claimed is:

1. A movable, fluid cooled/lubricated cutting tool apparatus adapted to provide compound mitering, the cutting tool apparatus comprising:

a work surface adapted to hold a workpiece in a stationary fashion during a cutting operation, the work surface having operatively associated therewith one or more of one or more stops, one or more fences or one or more clamps to hold the workpiece in a stationary fashion during a cutting operation;

a cutting tool unit support apparatus operationally disposed relative to the work surface, the cutting tool unit support apparatus being adapted to be disposed at any of a plurality of angles relative to the work surface to provide a first mitering option, the work surface being rotational relative to the cutting tool unit support apparatus to provide a second mitering option, the cutting tool unit support apparatus also including at least a substantially stationary support structure and one or more rear-mount glide rails;

wherein the one or more rear-mount glide rails are disposed within and are adapted to reciprocally and translationally slide within apertures defined in and through the substantially stationary support structure;

a cutting tool unit which is supported by the support apparatus, the cutting tool unit being connected to the one or more rear-mount glide rails at the rear side of the cutting tool unit, the one or more rear-mount glide rails extending from the rear side of the cutting tool unit, the cutting tool unit being reciprocally and translationally movable with the one or more rear-mount glide rails, during a cutting operation, relative to the substantially stationary support structure, and relative to the work surface and any workpiece held stationary thereon; the cutting tool unit and cutting tool support apparatus further including one or more of a deflection shield to deflect fluid and grit from the cutting tool unit and gusseted protective members to provide for expanding and contracting to continually cover the glide rails and deflect grit and fluid therefrom;

a cutting implement held by the cutting tool unit, whereby the cutting tool unit operates and controls the cutting implement during a cutting operation; and, a fluid coolant and/or lubricant system including an elongated fluid catch basin, a pump, and at least one fluid coolant and/or lubricant tube emanating from the fluid catch basin, connected at a first end to the pump and connected at a second end to the cutting tool unit, the at least one fluid coolant and/or lubricant tube being physically adapted to be reciprocally and translationally movable, during a cutting operation, in relation to the substantially stationary support structure and the work surface and any workpiece held stationary thereon when the cutting implement is in cutting operation, and being adapted to direct or flow a fluid from the fluid catch basin through the at least one fluid coolant and/or lubricant tube to the cutting implement during the cutting operation;

wherein the cutting tool unit together with the cutting implement and the at least one fluid coolant and/or lubricant tube reciprocally and translationally move in operation, during a cutting operation, with the glide rails in relation to the substantially stationary support structure and the work surface and any workpiece held stationary thereon when the cutting implement is in cutting operation to provide operational reciprocal and translational movability for the cutting tool unit and the cutting implement relative to the stationary workpiece; the at least one lubricant tube being adapted to be reciprocally and translationally movable, during a cutting operation, in relation to the substantially stationary support structure by presenting slack in a first position near the substantially stationary support structure, and having the slack substantially reduced during reciprocal and translational movement of the cutting tool unit, during a cutting operation, to a second position away from the substantially stationary support structure; the elongated catch basin being elongated so as to be adapted to catch fluid throughout operational cutting motion, during a cutting operation, of and along the entirety of the flow path from the cutting tool from the first position to the second position and back to the first position.

2. A cutting tool apparatus according to claim 1 wherein the cutting tool is a saw and the cutting implement is a saw blade.

3. A cutting tool apparatus according to claim 1 wherein the cutting tool is a saw and the cutting implement is a saw blade and wherein the at least one fluid coolant and/or lubricant tube provide for the flow of a fluid to the saw blade when the saw blade is in operation.

4. A cutting tool apparatus according to claim 1 wherein the cutting tool is a saw and the cutting implement is a saw blade and wherein the cutting tool unit further includes a saw blade cover and wherein the at least one fluid coolant and/or lubricant tube is connected to the saw blade cover in such a manner as to flow fluid to and through the saw blade cover to provide for the flow of a fluid to the saw blade when the saw blade is in operation.

5. A cutting tool apparatus according to claim 1 wherein the at least one fluid coolant and/or lubricant tube is a first such tube and the cutting tool apparatus further comprises a second fluid coolant and/or lubricant tube, wherein each of the first and second tubes are respectively disposed one on each side of cutting implement to provide a flow of fluid to each side of said cutting implement.

6. A cutting tool apparatus according to claim 1 wherein the at least one fluid coolant and/or lubricant tube communicates as a single such tube with a reservoir of fluid, and the single such tube branches into first and second tubing portions which are respectively disposed one on each side of the cutting implement to provide a flow of fluid to each side of said cutting implement.

7. A cutting tool apparatus according to claim 1 wherein the cutting tool unit has a base structure, and whereby the base structure of the cutting tool unit is connected to the one or more rear-mounted glide rails.

8. A cutting tool apparatus according to claim 1 wherein the cutting tool unit has a base structure, and whereby the base structure of the cutting tool unit is connected to the one or more rear-mounted glide rails and wherein the base structure has a pivotal connection therein providing for a pivoting motion of the cutting tool unit relative to the rear mounted glide rails.

9. A cutting tool apparatus according to claim 1 wherein the cutting tool unit has a base structure, the base structure of the cutting tool unit being connected to the one or more rear-mounted glide rails, whereby the base structure has a pivotal connection therein providing for a pivoting motion of the cutting tool unit relative to the rear mounted glide rails, whereby the pivoting motion is alternately down toward and up away from a workpiece to be or have been worked upon.

10. A cutting tool apparatus according to claim 1 wherein the cutting tool unit support apparatus is an angularly-disposed support which thereby provides weight support.

11. A cutting tool apparatus according to claim 1 wherein the cutting tool unit support apparatus is disposed upon a table-like support structure.

12. A cutting tool apparatus according to claim 1 wherein the cutting tool unit support apparatus is disposed upon a table-like support structure and wherein the table-like support structure is a portable folding structure.

13. A cutting tool apparatus according to claim 1 wherein the cutting tool unit support apparatus is disposed upon a rotatable portion of a table-like support structure, wherein the rotatable portion is adapted to rotate in a substantially horizontal plane about a substantially vertical pivot axis.

14. A cutting tool apparatus according to claim 1 wherein the cutting tool unit support apparatus is disposed upon a rotatable portion of a table-like support structure, wherein the rotatable portion is adapted to rotate in a substantially vertical plane about a substantially horizontal pivot axis.

15. A cutting tool apparatus according to claim 1 wherein the wherein the cutting tool unit support apparatus is disposed upon a table-like support structure, and wherein the table-like support structure has one or more of a rotatable structure lever, a rotatable table portion handle, graduated markings, a cutting fence, a clamp, a carrying handle, a coolant and/or lubricant fluid reservoir, one or more drainage apertures, a non-skid mat and an aperture for a coolant fluid tube.

16. A cutting tool apparatus according to claim 1 wherein the wherein the rear-mount glide rails have gusseted protective members disposed thereon, whereby the gusseted protective members provide for expanding and contracting to continually cover the glide rails.

17. A wet saw system comprising:
a foldable table structure;
a wet saw support apparatus operably disposed on the foldable table structure, the wet saw support apparatus operationally disposed relative to the foldable table structure, the wet saw support apparatus being adapted to be disposed at any of a plurality of angles relative to the foldable table structure to provide a first mitering option, the foldable table structure being rotational relative to the wet saw support apparatus to provide a second mitering option, the wet saw support apparatus also including at least a substantially stationary support structure and one or more rear-mount glide rails, the substantially stationary support structure having operatively associated therewith one or more of one or more stops, one or more fences or one or more clamps to hold a workpiece in a stationary fashion during a cutting operation;
wherein the one or more rear-mount glide rails are disposed within and are adapted to reciprocally and translationally slide within apertures defined in and through the substantially stationary support structure, the substantially stationary support structure being substantially stationary in a cutting operation, the one or more rear-mount glide rails being movable during a cutting operation, the rear-mount glide rails having gusseted protective members to provide for expanding and contracting to continually cover the glide rails and deflect grit and fluid therefrom;
a wet saw which is supported by the support apparatus being connected to the one or more rear-mount glide rails at and extending from the rear side of the wet saw, the wet saw being reciprocally and translationally movable in unison with the glide rails relative to the substantially stationary support structure when the cutting implement is in operation, during a cutting operation; the wet saw further including a deflection shield to deflect fluid and grit from therefrom;

a circular wet saw blade held by the wet saw, whereby the wet saw operates and controls the circular wet saw blade; and, a fluid coolant and/or lubricant system including an elongated catch basin, a pump, and at least one fluid coolant and/or lubricant tube emanating from the elongated catch basin, connected at a first end to the pump and connected at a second end to the wet saw, the at least one fluid coolant and/or lubricant tube being reciprocally and translationally movable in relation to the substantially stationary support structure when the cutting implement is in operation, during a cutting operation, and adapted to direct or flow a fluid from the elongated catch basin through the at least one fluid coolant and/or lubricant tube to the circular wet saw blade in operation, during a cutting operation;

wherein the wet saw in unison with the circular wet saw blade implement and the at least one fluid coolant and/or lubricant tube move with the glide rails, during a cutting operation, in relation to the substantially stationary support structure when the cutting implement is in operation, to provide reciprocal and translational movability for the wet saw and the wet saw blade; and wherein the at least one lubricant tube is adapted to be reciprocally and translationally movable, during a cutting operation, in relation to the substantially stationary support structure by presenting slack in a first position near the substantially stationary support structure, and having the slack substantially reduced during reciprocal and translational movement of the cutting tool unit, during a cutting operation, to a second position away from the substantially stationary support structure; the elongated catch basin being elongated so as to be adapted to catch fluid throughout motion of and along the entirety of the flow path from the cutting tool from the first position to the second position and back to the first position, during a cutting operation.

* * * * *